M. KELLY.
WATER JACKETED STOVE.
APPLICATION FILED APR. 3, 1912.
1,060,458.
Patented Apr. 29, 1913.
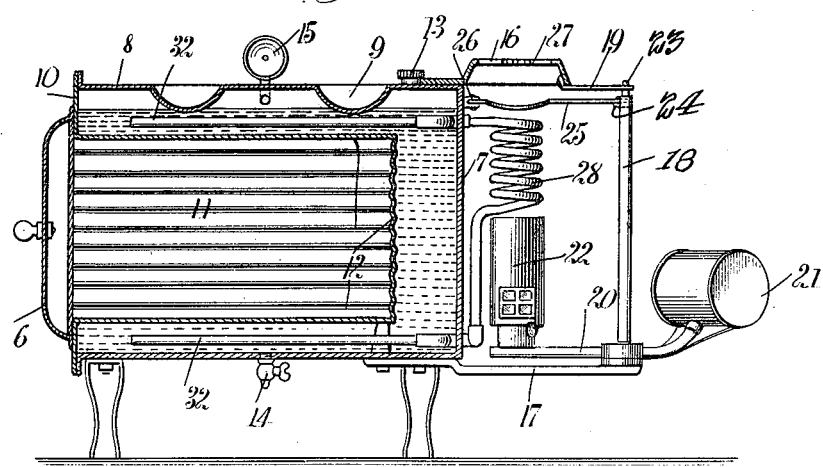
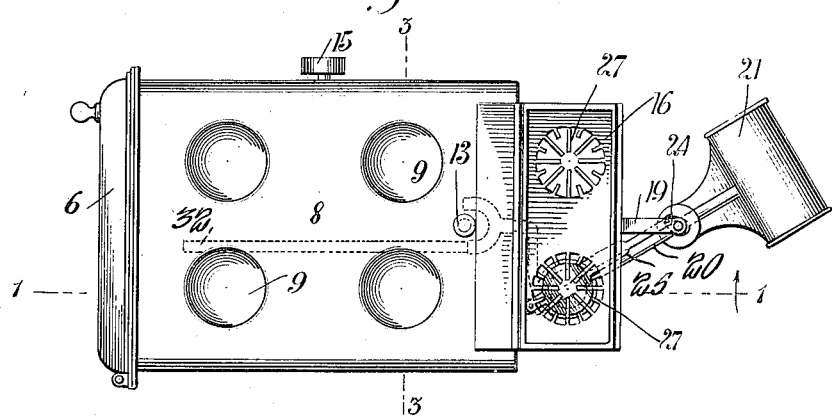
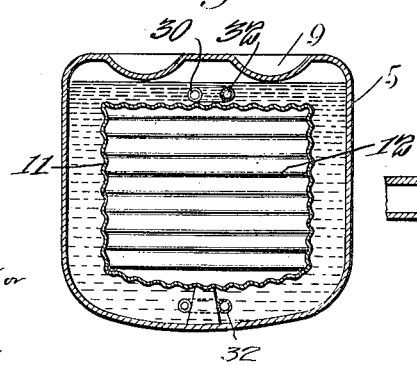
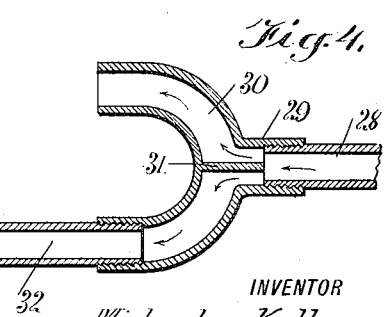
WITNESSES
Geo. W. Taylor
H. J. Orton
INVENTOR
Michael Kelly
BY Munn & Co
ATTORNEYS

UNITED STATES PATENT OFFICE.

MICHAEL KELLY, OF NEW YORK, N. Y.

WATER-JACKETED STOVE.

1,060,458.  Specification of Letters Patent.  Patented Apr. 29, 1913.

Application filed April 3, 1912. Serial No. 688,236.

*To all whom it may concern:*

Be it known that I, MICHAEL KELLY, a citizen of the United States, and a resident of the city of New York, borough of Manhattan, in the county and State of New York, have invented a new and Improved Water-Jacketed Stove, of which the following is a full, clear, and exact description.

My invention relates to a combined oil or gas stove and a water-jacketed oven.

An object of my invention is to construct a combined stove, one part of which is an ordinary gas or oil stove designed to heat a water-jacketed oven to a definite temperature, thermostatic means being provided for removing the heater to an inoperative position relative to the water in said jacket, so as to maintain said oven at a constant temperature.

A further object of my invention is to provide means for uniformly distributing the water through said water jacket.

Reference is to be had to the accompanying drawings, forming a part of this specification, in which similar characters of reference indicate corresponding parts in all the figures, and in which—

Figure 1 is a vertical longitudinal sectional view of a preferred embodiment of my invention taken on the line 1—1 of Fig. 2 and looking in the direction of the arrow; Fig. 2 is a plan view of the stove shown in Fig. 1; Fig. 3 is a transverse sectional view taken on the line 3—3 of Fig. 2; and Fig. 4 is an enlarged horizontal transverse section, showing a bifurcated joint between the heating coil and distributing pipe in the water jacket.

Described more in detail, I have shown a stove comprising an outer, preferably integral, shell 5, closed in front by means of a door 6, and having a back 7 integral with the shell. The relatively flat top 8 has formed therein a series of concave cup-shaped heating depressions 9. Disposed within the shell 5, fastened to the front 10 thereof and spaced from the inner walls of the shell, and from the back 7, is a shell 11 forming the oven, one end of which is closed, by means of the door 6, the opposite end of which is closed by means of the back 12 integral with the shell. The shell and back forming this oven are corrugated in order to increase the radiating surface of the oven.
The space between the oven and the shell 5 is practically filled with water or other suitable fluid, which is introduced into the same by means of an inlet 13 at the top rear portion thereof and may be withdrawn by means of a cock 14 shown in the lower central portion of the shell 5. Steam pressure within the stove is indicated by means of a gage 15.

Mounted upon the rear of the shell 5 and extending from the top thereof, is a suitable supporting plate 16, and extending from the bottom and rear of the shell 5 is a bracket 17, the outer end of which bracket forms a bearing for the lower end of a shaft 18, the upper end of which shaft is positioned adjacent the outer end of a strap 19 affixed to the central rear portion of the plate 16. Connected to said shaft 18 and rotatable therewith upon the bracket 17 is a tube 20 extending on opposite sides of the shaft 18. One end of this tube is in fluid connection with an oil or gas reservoir 21, and the opposite end leads to a suitable burner 22. The upper end of the shaft 18 is provided with a stud 23, whereby the shaft is centered and supported at its upper end by said strap 19. Rigidly attached to the upper end of the shaft 18 is an outwardly extending arm 24, attached to the free end of which arm is one end of a thermostat 25, which thermostat extends above the burner 22 and has its opposite end suitably attached to a bracket 26 carried by the back 7 below the plate 16.

It will be seen by the above-outlined construction that heating the thermostat will cause the burner to swing from its position beneath one of the spiders 27 to another spider. Disposed above the burner 22, when in normal position beneath one of the spiders 27, is a coil of tubing 28, each end of which leads to an inlet 29 of one of a pair of Y's 30, one disposed adjacent the top and the other disposed adjacent the bottom of the rear of the shell 5 just within the back 7. As shown more particularly in Fig. 4, each of these Y's 30 has a central partition 31 adapted to divide the current of water passing through the tube 28 into two streams, as shown by the arrows in said figure. Threaded into one of the branches of each of the Y's, is a pipe 32 extending forwardly through the water space between the oven 11 and the shell 5, so as to conduct the water to and from the front of the oven, and the opposite branch of each of the Y's maintains the circulation in the rear of the stove.

Having thus described my invention, I claim as new and desire to secure by Letters Patent:

1. The herein described stove comprising an outer shell, a shell within the outer shell and spaced therefrom forming a water-jacket, a heating coil exterior to said jacket and communicating therewith, a bifurcated extension connected to each end of said coil on the inside of the jacket, the bifurcations on the extensions being of unequal lengths, a pair of supports extending substantially parallel to each other at the end of the stove, a heating device between said supports and adapted to rotate on a vertical axis extending between said supports, said heating device in one position being adapted to act upon said coil, and thermostatic means associated with said coil to swing the heating device around its axis away from said coil when the temperature of the coil reaches a predetermined degree.

2. A stove comprising a closed outer shell, an oven within said shell and spaced from the same in order to form a water jacket about said oven, and a heating coil disposed exteriorly of said stove, the opposite ends leading into the water jacket at the top and the bottom of said stove, each of said ends being bifurcated, said bifurcations being of unequal lengths, to introduce and withdraw the water in said jacket to and from different portions thereof.

3. In a stove, the combination of a shell, a supporting plate extending from said shell, pivoted heating means disposed beneath said plate, a heating coil disposed between said plate and said heating means, said coil leading into said shell to heat the same, a thermostat disposed between said coil and said plate, and means controlled by said thermostat for swinging said heating means on its pivot, to remove the same from said heating coil.

In testimony whereof I have signed my name to this specification in the presence of two subscribing witnesses.

MICHAEL KELLY.

Witnesses:
W. S. ORTON,
PHILIP D. ROLLHAUS.